United States Patent
Lu

(10) Patent No.: US 12,557,170 B2
(45) Date of Patent: *Feb. 17, 2026

(54) SIDELINK TRANSMISSION METHOD AND TERMINAL

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 444 days.

This patent is subject to a terminal disclaimer.

(21) Appl. No.: 18/145,660

(22) Filed: Dec. 22, 2022

(65) Prior Publication Data

US 2023/0239961 A1    Jul. 27, 2023

Related U.S. Application Data

(63) Continuation of application No. PCT/CN2020/121318, filed on Oct. 15, 2020.

(51) Int. Cl.
  *H04W 76/28*    (2018.01)
  *H04W 52/02*    (2009.01)
  *H04W 72/232*   (2023.01)
  *H04W 72/40*    (2023.01)

(52) U.S. Cl.
  CPC ....... *H04W 76/28* (2018.02); *H04W 52/0216* (2013.01); *H04W 72/232* (2023.01); *H04W 72/40* (2023.01)

(58) Field of Classification Search
  CPC .......... H04W 76/28; H04W 52/0216; H04W 72/232; H04W 72/40; H04W 52/0219; H04W 52/0229; H04W 52/028; H04W 92/18; H04W 76/23; H04W 52/0235; H04W 72/25; H04L 1/1848; H04L 1/1822;
  (Continued)

(56) References Cited

U.S. PATENT DOCUMENTS

| 2015/0055532 A1 | 2/2015 | Lu et al. |
| 2016/0227602 A1 | 8/2016 | Yi et al. |
| 2016/0255523 A1 | 9/2016 | Yi et al. |

(Continued)

FOREIGN PATENT DOCUMENTS

| AU | 2017439706 A1 | 7/2020 |
| CN | 104871635 A | 8/2015 |

(Continued)

OTHER PUBLICATIONS

First Office Action of the European application No. 20957174.4, issued on Jul. 17, 2024. 8 pages.
(Continued)

*Primary Examiner* — Rownak Islam
(74) *Attorney, Agent, or Firm* — PERKINS COIE LLP

(57) ABSTRACT

The present application relates to a sidelink transmission method and a terminal. The method includes: a terminal receives downlink information, the downlink information being used to indicate the resource authorization of a sidelink; and the terminal controls, on the basis of a first event, the state of a timer related to discontinuous reception (DRX) for the sidelink.

20 Claims, 4 Drawing Sheets

(58) Field of Classification Search
CPC ..... H04L 1/1864; H04L 1/1812; H04L 69/28; Y02D 30/70
USPC .......................................................... 370/311
See application file for complete search history.

(56) References Cited

U.S. PATENT DOCUMENTS

| | | | |
|---|---|---|---|
| 2017/0041875 | A1 | 2/2017 | Lu et al. |
| 2018/0302814 | A1 | 10/2018 | Yi et al. |
| 2018/0352473 | A1* | 12/2018 | Gunasekara .......... H04W 28/04 |
| 2019/0053322 | A1 | 2/2019 | Wu et al. |
| 2019/0098689 | A1 | 3/2019 | Wei et al. |
| 2019/0174411 | A1 | 6/2019 | Xu et al. |
| 2020/0275474 | A1 | 8/2020 | Chen et al. |
| 2020/0296668 | A1 | 9/2020 | Xu et al. |
| 2021/0306948 | A1* | 9/2021 | Ding ................. H04W 52/0235 |
| 2022/0095229 | A1* | 3/2022 | Ryu ....................... H04W 72/20 |
| 2022/0159574 | A1 | 5/2022 | Islam et al. |
| 2022/0210815 | A1 | 6/2022 | Chen |
| 2022/0353815 | A1* | 11/2022 | Lin ................... H04W 52/0232 |
| 2022/0394810 | A1* | 12/2022 | Hong ................... H04W 72/23 |
| 2023/0180342 | A1 | 6/2023 | Shin |
| 2023/0262601 | A1 | 8/2023 | Ganesan |
| 2023/0262738 | A1 | 8/2023 | Loehr |
| 2023/0276364 | A1 | 8/2023 | Basu Mallick |
| 2023/0276527 | A1 | 8/2023 | Karampatsis |

FOREIGN PATENT DOCUMENTS

| | | |
|---|---|---|
| CN | 108307486 A | 7/2018 |
| CN | 104871635 B | 9/2018 |
| CN | 110089061 A | 8/2019 |
| CN | 111405610 A | 7/2020 |
| CN | 111466151 A | 7/2020 |
| CN | 111556590 A | 8/2020 |
| CN | 111600682 A | 8/2020 |
| CN | 111670603 A | 9/2020 |
| CN | 112399644 A | 2/2021 |
| CN | 116056254 A | 5/2023 |
| CN | 116368938 A | 6/2023 |
| CN | 117812757 A | 4/2024 |
| EP | 4104630 A1 | 12/2022 |
| EP | 4142425 A1 | 3/2023 |
| EP | 4179836 A2 | 5/2023 |
| EP | 4179842 A1 | 5/2023 |
| EP | 4221386 A1 | 8/2023 |
| RU | 2712434 C1 | 1/2020 |
| WO | 2018028416 A1 | 2/2018 |
| WO | 2018064477 A1 | 4/2018 |
| WO | 2022013698 A2 | 1/2022 |

OTHER PUBLICATIONS

First Office Action of the Chinese application No. 202080105130.5, issued on Jul. 22, 2024. 45 pages with English translation.
International Search Report in the international application No. PCT/CN2020/142028, mailed on Jul. 15, 2021. 5 pages with English translation.
Written Opinion of the International Search Authority in the international application No. PCT/CN2020/142028, mailed on Jul. 15, 2021. 6 pages with English translation.
LG Electronics, "New WID on NR sidelink enhancement", 3GPP TSG RAN Meeting #86 RP-193231, (revision of RP-193134), Sitges, Spain, Dec. 9-12, 2019. 6 pages.
Vivo, "Discussion on sidelink DRX", 3GPP TSG RAN WG1 #102-e R1-2005405, e-Meeting, Aug. 17-28, 2020. 3 pages.
International Search Report in the international application No. PCT/CN2020/121318, mailed on Jul. 14, 2021. 5 pages with English translation.
Written Opinion of the International Search Authority in the international application No. PCT/CN2020/121318, mailed on Jul. 14, 2021. 6 pages with English translation.
Second Office Action of the Chinese application No. 202080105130. 5, issued on Oct. 21, 2024. 46 pages with English translation.
First Office Action of the European application No. 20957552.1, issued on Nov. 11, 2024. 7 pages.
Supplementary European Search Report in the European application No. 20957174.4, mailed on Oct. 16, 2023. 9 pages.
Huawei et al: "Discussion on remaining MAC open issues for 5G V2X with NR SL", 3GPP Draft; R2-2005492, 3rd Generation Partnership Project (3GPP), Mobile Competence Centre; 650, Route Des Lucioles; F-06921 Sophia-Antipolis Cedex; France, vol. RAN WG2, No. electronic; Jun. 1, 2020-Jun. 12, 2020, May 22, 2020 (May 22, 2020), XP051888819, paragraph [02.1], paragraph [05.7], paragraph [5.22.1.1]. 45 pages.
Supplementary European Search Report in the European application No. 20957552.1, mailed on Feb. 7, 2024. 9 pages.
Office Action of the Indian application No. 202327033103, issued on Feb. 22, 2024. 7 pages with English translation.
First Office Action of the Russian application No. 2023112326, issued on Mar. 6, 2024. 14 pages with English translation.
Non Final Office Action of the U.S. Appl. No. 18/146,549, issued on Mar. 27, 2025. 52 pages.
Second Office Action of the European application No. 20957552.1, issued on Mar. 31, 2025. 8 pages.
First Office Action of the Indonesian application No. P00202304160, issued on Oct. 21, 2025.
Written Opinion of the Singaporean application No. 11202302694R, issued on Nov. 18, 2025.
Final Office Action of the U.S. Appl. No. 18/146,549, issued on Sep. 23, 2025.

* cited by examiner

SIDELINK TRANSMISSION METHOD AND TERMINAL

CROSS-REFERENCE TO RELATED APPLICATION

This application is a continuation of International Patent Application No. PCT/CN2020/121318 filed on Oct. 15, 2020. The entire content of the prior application is incorporated by reference herein in its entirety.

BACKGROUND

Device to Device (D2D) communication is a transmission technology based on sidelink (SL). Unlike manners in which communication data in a conventional cellular system is received or transmitted by a base station, a Vehicle to Everything (V2X) system uses a terminal-to-terminal direct communication manner, and thus has higher spectral efficiency and lower transmission delay.

In a long-term evolution (LTE) system, Discontinuous Reception (DRX) is an energy-saving mechanism. In sidelink transmission, a problem which needs to be considered is how to optimize the DRX to reduce energy consumption of a terminal.

SUMMARY

The disclosure relate to the technical field of communication, and more particularly, to a sidelink transmission method and a terminal.

An embodiment of the disclosure provides a sidelink transmission method, which includes the following operations.

A terminal receives downlink information. The downlink information is configured to indicate resource grant of a sidelink.

The terminal controls a state of a timer related to DRX for the sidelink based on a first event.

An embodiment of the disclosure provides a terminal, including a reception unit and a processing unit.

The reception unit is configured to receive downlink information. The downlink information is configured to indicate resource grant of a sidelink.

The processing unit is configured to control a state of a timer related to DRX for the sidelink based on a first event.

An embodiment of the disclosure provides a terminal, which includes a processor and a memory. The memory is configured to store a computer program, and the processor is configured to call and run the computer program stored in the memory to enable the terminal device to execute the above sidelink transmission method.

An embodiment of the disclosure provides a chip configured to implement the above sidelink transmission method.

Specifically, the chip includes a processor configured to call and run a computer program from a memory to enable a device installed with the chip to execute the above sidelink transmission method.

An embodiment of the disclosure provides a computer-readable storage medium which is configured to store a computer program. The computer program enables a device to execute the above sidelink transmission method when executed by the device.

An embodiment of the disclosure provides a computer program product which includes a computer program instruction. The computer program instruction enables a computer to execute the above sidelink transmission method.

An embodiment of the disclosure provides a computer program, which enables a computer to execute the above sidelink transmission method when executed on the computer.

DETAILED DESCRIPTION

Figure 1:
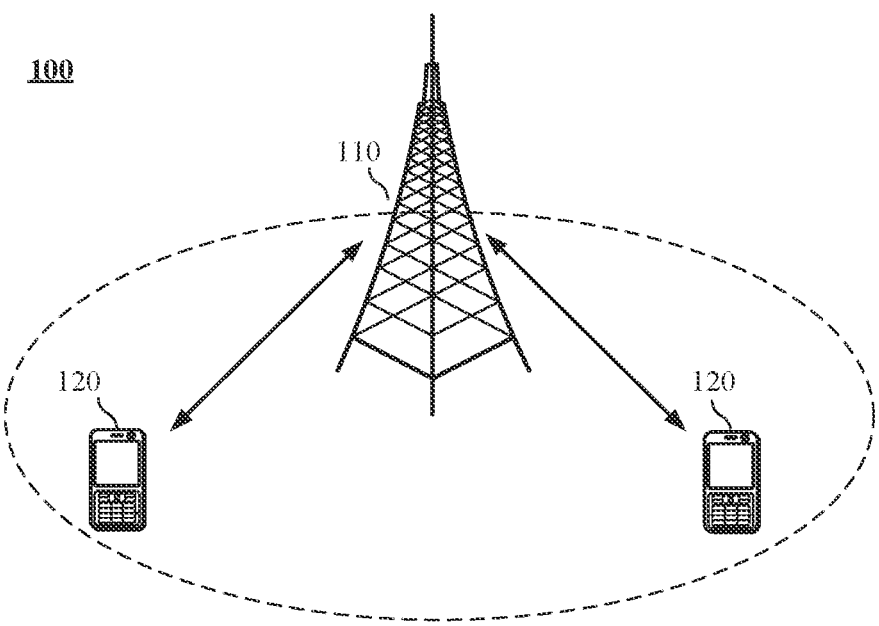
FIG. 1 is a diagram of an application scenario according to an embodiment of the disclosure.

Technical solutions in the embodiments of the disclosure would be described below in combination with the drawings in the embodiments of the disclosure.

The embodiments of the disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of NR system, a LTE-based access to unlicensed spectrum (LTE-U) system, a NR-based access to unlicensed spectrum (NR-U) system, a Non-Terrestrial Network (NTN) system, a Universal Mobile Telecommunication System (UMTS), a Wireless Local Area Network (WLAN), a Wireless Fidelity (WiFi), a 5th-Generation communication (5G) system, or another communication system, or the like.

Generally speaking, a limited number of connections are supported by a conventional communication system, and are also easy to be implemented. However, with the development of communication technologies, a mobile communication system may not only support conventional communication, but also support communication such as D2D communication, Machine to Machine (M2M) communication, Machine Type Communication (MTC), Vehicle to Vehicle (V2V) communication, or V2X communication, or the like, and the embodiments of the disclosure may also be applied to these communication systems.

Optionally, the communication system in the embodiments of the disclosure may be applied to a Carrier Aggregation (CA) scenario, or may be applied to a Dual Connectivity (DC) scenario, or may be applied to a standalone (SA) networking scenario.

Optionally, the communication system in the embodiments of the disclosure may be applied to an unlicensed spectrum. The unlicensed spectrum may also be considered to be a shared spectrum. Alternatively, the communication system in the embodiments of the disclosure may also be applied to a licensed spectrum. The licensed spectrum may also be considered to be a non-shared spectrum.

The embodiments of the disclosure describe various embodiments in combination with a network device and a terminal device. The terminal device may also be referred to as a User Equipment (UE), an access terminal, a user unit, a user station, a mobile station, a mobile platform, a remote station, a remote terminal, a mobile device, a user terminal, a terminal, a wireless communication device, a user agent, or a user device, or the like.

The terminal device may be a STAION (ST) in WLAN, or may be a cellular phone, a cordless phone, a Session Initiation Protocol (SIP) phone, a Wireless Local Loop (WLL) station, a Personal Digital Assistant (PDA) device, a handheld device with a wireless communication function, a computing device or other processing devices connected to a wireless modem, a vehicle-mounted device, a wearable device, a terminal device in a next-generation communication system such as an NR network, or a terminal device in a future-evolved Public Land Mobile Network (PLMN) network, or the like.

In the embodiments of the disclosure, the terminal device may be deployed on land, including indoor or outdoor, handheld, wearable, or vehicle-mounted; or may be deployed on a water surface (such as a ship); or may be deployed in the air (such as an aircraft, a balloon, a satellite, or the like).

In the embodiments of the disclosure, the terminal device may be a mobile phone, a tablet computer (Pad), a computer with a wireless transceiving function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, or the like.

As an example rather than limitation, in the embodiments of the disclosure, the terminal device may also be a wearable device. The wearable device may also be referred to as a wearable smart device, which is a general term of wearable devices developed by applying a wearable technology to intelligently design daily wearable objects, such as glasses, gloves, watches, clothing, shoes, or the like. The wearable device is directly worn on the body, or is a portable device integrated into a user's clothing or accessory. The wearable device is not only a hardware device, but also achieves powerful functions through software support, data interaction and cloud interaction. A generalized wearable smart device has full functions and a large size, and may not rely on a smart phone to implement full or part of the functions, such as a smart watch, or smart glasses, or the like; or only focus on a certain type of application function, and needs to be used in cooperation with other devices such as a smart phone, such as various kinds of smart bracelets, smart jewelry, or the like, for monitoring physical signs.

In the embodiments of the disclosure, the network device may be a device communicating with a mobile device. The network device may be an Access Point (AP) in WLAN, a Base Transceiver Station (BTS) in GSM or CDMA, or a NodeB (NB) in WCDMA, or an Evolutional Node B (eNB or eNodeB) in LTE, or a relay station or AP, or a network device (gNB) in a vehicle-mounted device, a wearable device and an NR network, or a network device in a future-evolved PLMN network, or a network device in an NTN network, or the like.

As an example rather than limitation, in the embodiments of the disclosure, the network device may have a mobility characteristic, for example, the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, or the like. Optionally, the network device may also be a base station arranged at a position such as land or water area, or other positions.

In the embodiments of the disclosure, the network device may provide services for a cell, and the terminal device may communicate with the network device through transmission resources (such as frequency domain resources or spectrum resources) used by the cell. The cell may be a cell corresponding to the network device (such as a base station), and the cell may belong to a macro base station, or may belong to a base station corresponding to a small cell. The small cell may include a metro cell, a micro cell, a pico cell, a femto cell, or the like. The small cells have characteristics of small coverage and low transmission power, and are suitable for providing high-rate data transmission services.

FIG. 1 exemplarily shows a communication system 100, which includes a network device 110 and two terminal devices 120. Optionally, the communication system 100 may include multiple network devices 110, and other numbers of terminal devices 120 may be included within a respective coverage of each of the network devices 110, which are not limited in the embodiments of the disclosure.

Optionally, the communication system 100 may further include other network entities such as a Mobility Management Entity (MME), an Access and Mobility Management Function (AMF), or the like, which are not limited in the embodiments of the disclosure.

The network device may further include an access network device and a core network device. That is, a wireless communication system may further include multiple core networks communicating with the access network device. The access network device may be an eNB or e-NodeB, a macro base station, a micro base station (also referred to as a "small base station"), a pico base station, an AP, a transmission point (TP), or a new generation Node B (gNodeB) in a LTE system, a Next Radio (NR) system or an Authorized Auxiliary Access Long-Term Evolution (LAA-LTE) system, or the like.

It should be understood that in the embodiments of the disclosure, a device with a communication function in a network/system may be referred to as a communication device. Taking the communication system illustrated in FIG. 1 as an example, the communication device may include a network device and a terminal device of which each has a communication function. Each of the network device and the terminal device may be a specific device in the embodiments of the disclosure, and is not elaborated here. The communication device may further include other devices in the communication system, such as a network controller, a MME or other network entities, which are not limited in the embodiments of the disclosure.

It should be understood that terms "system" and "network" in the disclosure may usually be used interchangeably. In the disclosure, term "and/or" refers to only an association relationship for describing associated objects and represents that three relationships may exist. For example, A and/or B may represent three cases: i.e., only A exists, both A and B exist, and only B exists. Furthermore, character "/" in the disclosure usually represents that previous and next associated objects form an "or" relationship.

It should be understood that "indication" mentioned in the embodiments of the disclosure may be a direct indication, or may be an indirect indication, or may be represented as having an association relationship. For example, A indicates B, which may indicate that A directly indicates B, for example, B may be obtained by A; or may indicate that A indirectly indicates B, for example, A indicates C, and B may be obtained by C; or may indicate that A and B have an association relationship there-between.

In descriptions of the embodiments of the disclosure, term "corresponding" may indicate that there are direct or indirect correspondences between two objects, or may indicate that the two objects have an association relationship there-between, or may have an indicating and indicated relationship, a configuring and configured relationship, or the like.

In order to facilitate understanding the technical solutions of the embodiments of the disclosure, related technologies of the embodiments of the disclosure are described below. The following related technologies may be used as optional solutions, and may be arbitrarily combined with the technical solutions of the embodiments of the disclosure, which belong to a scope of protection of the embodiments of the disclosure.

Figure 2:
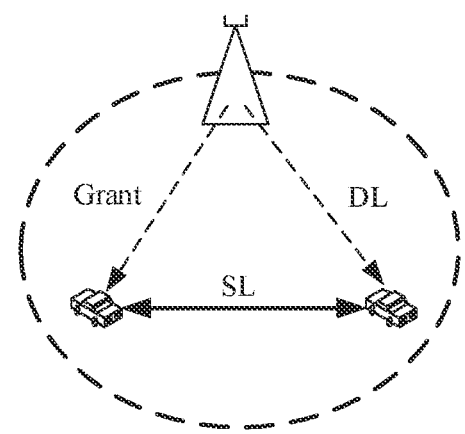
FIG. 2 is a diagram of a mode-A.
Figure 3:
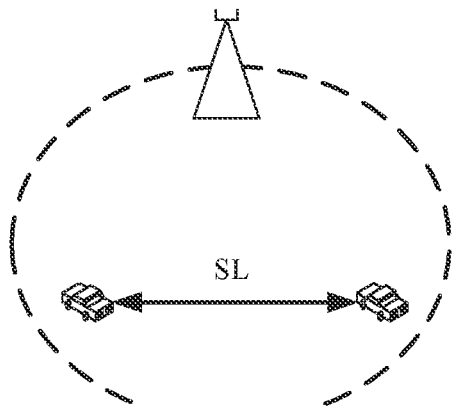
FIG. 3 is a diagram of a mode-B.

As illustrated in FIG. 2 and FIG. 3, the 3rd Generation Partnership Project (3GPP) includes the following transmission modes: mode-A and mode-B.

Mode-A: transmission resources of a terminal are allocated by a base station, and the terminal transmits data on a sidelink according to resources allocated by the base station. The base station may allocate resources for single transmission to the terminal, or may allocate resources for semi-static transmission to the terminal.

Mode-B: the terminal device selects a resource from a resource pool to transmit data, and the terminal device may be a vehicle-mounted terminal in V2X.

In an evolution process of 3GPP protocol, D2D may include the following scenarios:

Proximity based Service (ProSe): D2D communication in Rel-12/13 mainly aims at a ProSe scenario, and is applicable to services of public security types.

V2X: in Rel-14/15, a V2X system mainly aims at a V2V communication scenario, and mainly faces services of communication between vehicles moving at relatively high-speeds, and communication between the vehicles and persons.

Wearable device (FeD2D): in Rel-14, FeD2D mainly aims at a scenario where a wearable device accesses a network through a mobile phone, and mainly faces scenarios of low moving speed and low power access.

Based on LTE V2X, NR V2X is not limited to a broadcast scenario, and is further expanded to unicast and multicast scenarios. Application of V2X is studied in these scenarios.

Similar to LTE V2X, NR V2X also defines two resource grant modes, i.e., the above-mentioned mode-A and mode-B. Furthermore, a user may be in a mixed mode, that is, the user may not only use the mode-A to obtain resources, but also use the mode-B to obtain resources.

Unlike LTE V2X, in addition to Hybrid Automatic Repeat reQuest (HARQ) retransmission without feedback and initiated by UE autonomously, NR V2X introduces feedback-based HARQ retransmission, which is not limited to unicast communication, and also includes multicast communication.

DRX is introduced as follows.

A user needs to perform DRX during downlink reception to save power. Considering that a network may transmit resource grant for a sidelink to the user through downlink (that is, by way of the mode-A), a problem existed here is how to perform DRX during downlink reception with respect to the "resource grant for a sidelink".

In LTE, a UE may be configured as the mode-A and use the DRX simultaneously. However, the network does not specifically optimize the DRX with respect to the "resource grant for a sidelink". That is, the UE may determine whether to enter sleep for power saving according to Uu interface rather than parameters/timers related to the sidelink, or the like. In NR, UE cannot be configured as the mode-A and use the DRX simultaneously at present.

The disclosure may be applied to the NR. In a scenario where the UE can be configured as the mode-A and use the DRX simultaneously, the DRX is specifically optimized with respect to the "resource grant for a sidelink", and parameters and timers related to the DRX with respect to the "resource grant for a sidelink" are proposed.

Figure 4:
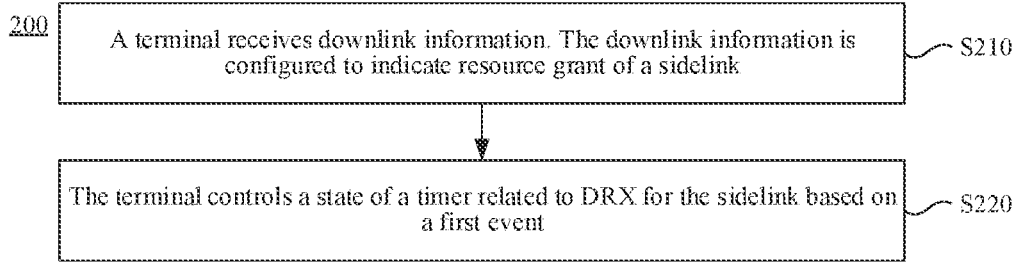
FIG. 4 is a flowchart of a sidelink transmission method according to an embodiment of the disclosure.

FIG. 4 is a flowchart of a sidelink transmission method 200 according to an embodiment of the disclosure. The method may be optionally applied to the system illustrated in FIG. 1 to FIG. 3, but is not limited thereto. The method includes at least part of the following contents.

At S210, a terminal receives downlink information. The downlink information is configured to indicate resource grant of a sidelink.

At S220, the terminal controls a state of a timer related to DRX for the sidelink based on a first event.

Optionally, in the embodiment of the disclosure, the downlink information is carried by a Physical Downlink Control Channel (PDCCH).

Optionally, in the embodiment of the disclosure, the timer related to the DRX comprises at least one of a round-trip time (RTT) timer or a retransmission timer.

Optionally, in the embodiment of the disclosure, the state of the timer related to the DRX for the sidelink is controlled, which may include at least one of the following operations.

The RTT timer for the sidelink is started.

In response to expiration of the RTT timer, a retransmission timer for the sidelink is started.

For example, in a case that the timer related to the DRX includes the RTT timer for the sidelink and the retransmission timer for the sidelink, the terminal may start the RTT timer for the sidelink based on the first event. In response to the expiration of the RTT timer, the terminal may start the retransmission timer for the sidelink.

Optionally, in the embodiment of the disclosure, the state of the timer related to the DRX for the sidelink is controlled, which may include the following operation.

A retransmission timer for the sidelink is started.

For example, in a case that the timer related to the DRX includes the retransmission timer for the sidelink, the terminal may start the retransmission timer for the sidelink based on the first event.

Optionally, in the embodiment of the disclosure, the state of the timer related to the DRX for the sidelink is controlled, which may further include the following operation:

A running retransmission timer for the sidelink is stopped.

For example, transmission of the sidelink may be continuous. In a case that there is a retransmission timer running in the sidelink, the terminal may stop the running retransmission timer based on the first event. Then, a RTT timer for the sidelink is started. In response to the expiration of the RTT timer, the retransmission timer for the sidelink is started.

For another example, in a case that there is no RTT timer for the sidelink, the terminal may restart the retransmission timer for the sidelink based on the first event.

In the embodiment of the disclosure, after the terminal starts the retransmission timer for the sidelink, the terminal is in a wake-up state of DRX and may monitor a downlink channel during operation of the retransmission timer. For example, the terminal performs downlink PDCCH reception for a specific HARQ process of the sidelink. After the terminal obtains the resource grant for the sidelink allocated by the network to the terminal, the terminal may perform sidelink communication with other terminals of the sidelink based on the resource grant for the sidelink. In case that the retransmission timer for the sidelink is not started, the terminal is in a sleep state of DRX and may not monitor the downlink channel, thereby achieving energy saving and power saving effects.

In the embodiment of the disclosure, after the terminal starts the RTT timer for the sidelink, the terminal does not need to monitor the downlink channel during operation of the timer. For example, during the operation of the RTT timer, the terminal does not need to perform downlink PDCCH reception, or does not need to perform the downlink PDCCH reception for a specific HARQ process of the sidelink.

Optionally, in the embodiment of the disclosure, the method may further include the following operation.

The terminal determines whether to start the retransmission timer for the sidelink based on feedback information.

Optionally, in the embodiment of the disclosure, the terminal determines whether to start the retransmission timer for the sidelink based on the feedback information, which may include at least one of the following operations.

The retransmission timer for the sidelink is not started, in response to the feedback information being acknowledgement (ACK) information.

The retransmission timer for the sidelink is started, in response to the feedback information being non-acknowledgement (NACK) information.

The retransmission timer for the sidelink is started, in response to reception of the feedback information.

The retransmission timer for the sidelink is not started, in response to no reception of the feedback information.

For example, the terminal may determine whether to start the retransmission timer for the sidelink based on a transmission situation of a peer side represented by the received feedback information. The feedback information received by the terminal is the ACK information, which may indicate that the peer side successfully receives data from the terminal, and the retransmission timer for the sidelink may not be started. The feedback information received by the terminal is the NACK information, which may indicate that the peer side does not successfully receive the data from the terminal, and the retransmission timer for the sidelink may be started.

For another example, the terminal may determine whether to start the retransmission timer for the sidelink based on whether the feedback information is received. The terminal does not receive the feedback information from the peer side, which may indicate that the peer side successfully receives the data from the terminal or the peer side does not need the retransmission, and the retransmission timer for the sidelink may not be started. The terminal receives the feedback information, which may indicate that the peer side does not successfully receive the data from the terminal or the peer side needs the retransmission, and the retransmission timer for the sidelink may be started.

Optionally, in the embodiment of the disclosure, the first event may include the following.

The terminal receives downlink resources including the downlink information. The downlink resources may be a control channel or a data channel, such as a PDCCH or a Physical Downlink Shared Channel (PDSCH).

Optionally, the first event may include: when the terminal receives the downlink resources including the downlink information.

For example, the retransmission timer for the sidelink may be started when the terminal receives the PDCCH. For another example, the RTT timer for the sidelink may be started when the terminal receives the PDCCH, and the retransmission timer for the sidelink may be started in response to the expiration of the RTT timer.

Optionally, the first event may include: after the terminal receives the downlink resources including the downlink information, which means that the first event does not occur along with reception of the downlink resources, instead, there is a certain interval in time sequence there-between. Exemplarily, the first event occurs at a first time unit or a specific number of time units after the terminal receives the downlink resources including the downlink information. For example, at a next slot, a next symbol, or a predetermined number of slots or symbols in time sequence after receiving the downlink resources, the first event may control the state of the timer related to the DRX for the sidelink.

For example, the retransmission timer for the sidelink may be started after the terminal receives the PDCCH. For another example, the RTT timer for the sidelink may be started after terminal receives the PDCCH, and the retransmission timer for the sidelink may be started in response to the expiration of the RTT timer.

Optionally, in the embodiment of the disclosure, the first event may include the following.

The terminal transmits at least one of a Physical Sidelink Control Channel (PSCCH) or a Physical Sidelink Shared Channel (PSSCH).

Exemplarily, the first event may only include that the terminal transmits at least one of the PSCCH or the PSSCH. The first event may also include that the terminal receives the PDCCH, and that the terminal transmits at least one of the PSCCH or the PSSCH.

Optionally, the first event may include: when the terminal transmits at least one of the PSCCH or the PSSCH.

For example, the retransmission timer for the sidelink may be started when the terminal transmits at least one of the PSCCH or the PSSCH.

For another example, the RTT timer for the sidelink may be started when the terminal transmits at least one of the PSCCH or the PSSCH, and the retransmission timer for the sidelink may be started in response to the expiration of the RTT timer.

For another example, the RTT timer for the sidelink may be started when the terminal receives the PDCCH, and the retransmission timer for the sidelink may be started in response to the expiration of the RTT timer. The RTT timer for the sidelink may be restarted when the terminal transmits the PSSCH, and the retransmission timer for the sidelink may be restarted in response to the expiration of the RTT timer.

Optionally, the first event may include: after the terminal transmits at least one of the PSCCH or the PSSCH. Exemplarily, the state of the timer related to the DRX for the sidelink is controlled at a first time unit after the terminal transmits at least one of the PSCCH or the PSSCH.

For example, the retransmission timer for the sidelink may be started after the terminal transmits at least one of the PSCCH or the PSSCH.

For another example, the RTT timer for the sidelink may be started after terminal transmits at least one of the PSCCH or the PSSCH, and the retransmission timer for the sidelink may be started in response to the expiration of the RTT timer.

For another example, the retransmission timer for the sidelink may be started after the terminal receives the PDCCH. The retransmission timer for the sidelink may be restarted after the terminal transmits the PSCCH.

For another example, the RTT timer for the sidelink may be started after the terminal receives the PDCCH, and the retransmission timer for the sidelink may be started in response to the expiration of the RTT timer. The RTT timer for the sidelink may be restarted after the terminal transmits the PSSCH, and the retransmission timer for the sidelink may be restarted in response to the expiration of the RTT timer.

Optionally, in the embodiment of the disclosure, the first event includes may include the following operation.

The terminal receives a Physical Sidelink Feedback Channel (PSFCH).

Exemplarily, the first event may only include that the terminal receives the PSFCH. The first event may also include that the terminal receives the PDCCH, and that the terminal receives the PSFCH. The first event may also include that the terminal receives the PDCCH, that the terminal transmits at least one of the PSCCH or the PSSCH, and that the terminal receives the PSFCH.

Optionally, the first event may include: when the terminal receives the PSFCH.

For example, the retransmission timer for the sidelink may be started when the terminal receives the PSFCH.

For another example, the RTT timer for the sidelink may be started when the terminal receives the PSFCH, and the retransmission timer for the sidelink may be started in response to the expiration of the RTT timer.

For another example, the retransmission timer for the sidelink may be started after the terminal receives the PDCCH. The retransmission timer for the sidelink may be restarted when the terminal transmits the PSSCH. The retransmission timer for the sidelink may be restarted again when the terminal receives the PSFCH.

For another example, the RTT timer for the sidelink may be started after the terminal receives the PDCCH, and the retransmission timer for the sidelink may be started in response to the expiration of the RTT timer. The RTT timer for the sidelink may be restarted after the terminal transmits the PSSCH, and the retransmission timer for the sidelink may be restarted in response to the expiration of the RTT timer. The RTT timer for the sidelink may be restarted again when the terminal receives the PSFCH, and the retransmission timer for the sidelink may be started in response to the expiration of the RTT timer.

Optionally, the first event may include: after the terminal receives the PSFCH. Exemplarily, the state of the timer related to the DRX for the sidelink may be controlled at a first time unit after the terminal receives the PSFCH.

For example, the retransmission timer for the sidelink may be started after the terminal receives the PSFCH.

For another example, the RTT timer for the sidelink may be started after the terminal receives the PSFCH, and the retransmission timer for the sidelink may be started in response to the expiration of the RTT timer.

For another example, the retransmission timer for the sidelink may be started after the terminal receives the PDCCH. The retransmission timer for the sidelink may be restarted after the terminal transmits the PSSCH. The retransmission timer for the sidelink may be restarted again after the terminal receives the PSFCH.

For another example, the RTT timer for the sidelink may be started after the terminal receives the PDCCH, and the retransmission timer for the sidelink may be started in response to the expiration of the RTT timer. The RTT timer for the sidelink may be restarted after the terminal transmits the PSSCH, and the retransmission timer for the sidelink may be started in response to the expiration of the RTT timer. The RTT timer for the sidelink may be restarted again after the terminal receives the PSFCH, and the retransmission timer for the sidelink may be started in response to the expiration of the RTT timer.

Optionally, in the embodiment of the disclosure, the first event includes:

The terminal transmits a Physical Uplink Control Channel (PUCCH).

Exemplarily, the first event may only include that the terminal transmits the PUCCH. The first event may also include that the terminal receives the PDCCH, and that the terminal transmits the PUCCH. The first event may also include that the terminal receives the PDCCH, that the terminal transmits at least of the PSCCH or the PSSCH, and that the terminal transmits the PUCCH. The first event may also include that the terminal receives the PDCCH, that the terminal transmits at least one of the PSCCH or the PSSCH, that the terminal receives the PSFCH, and that the terminal transmits the PUCCH.

Optionally, the first event may include: when the terminal transmits the PUCCH.

For example, the retransmission timer for the sidelink may be started when the terminal transmits the PUCCH.

For another example, the RTT timer for the sidelink may be started when the terminal transmits the PUCCH, and the retransmission timer for the sidelink may be started in response to the expiration of the RTT timer.

For another example, the retransmission timer for the sidelink may be started when the terminal receives the PDCCH. The retransmission timer for the sidelink may be restarted when the terminal transmits the PUCCH.

For another example, the retransmission timer for the sidelink may be started after the terminal receives the PDCCH. The retransmission timer for the sidelink may be restarted when the terminal transmits the PSSCH. The retransmission timer for the sidelink may be restarted again after the terminal receives the PSFCH. The retransmission timer for the sidelink may be restarted when the terminal transmits the PUCCH.

Optionally, the first event may include: after the terminal transmits the PUCCH. Exemplarily, the state of the timer related to the DRX for the sidelink may be controlled at a first time unit after the terminal transmits the PUCCH.

For example, the retransmission timer for the sidelink may be started after the terminal transmits the PUCCH.

For another example, the RTT timer for the sidelink may be started after the terminal transmits the PUCCH, and the retransmission timer for the sidelink may be started in response to the expiration of the RTT timer.

For another example, the retransmission timer for the sidelink may be started after the terminal receives the PDCCH. The retransmission timer for the sidelink may be restarted after the terminal transmits the PUCCH.

For another example, the retransmission timer for the sidelink may be started after the terminal receives the PDCCH. The retransmission timer for the sidelink may be restarted after the terminal transmits the PSSCH. The retransmission timer for the sidelink may be restarted again after the terminal receives the PSFCH. The retransmission timer for the sidelink may be restarted after the terminal transmits the PUCCH.

For another example, the RTT timer for the sidelink may be started after the terminal receives the PDCCH, and the retransmission timer for the sidelink may be started in response to the expiration of the RTT timer. The RTT timer for the sidelink may be restarted after the terminal transmits the PSSCH, and the retransmission timer for the sidelink may be started in response to the expiration of the RTT timer. The RTT timer for the sidelink may be restarted again after the terminal receives the PSFCH, and the retransmission timer for the sidelink may be started in response to the expiration of the RTT timer. The RTT timer for the sidelink may be restarted again after the terminal transmits the PUCCH, and the retransmission timer for the sidelink may be started in response to the expiration of the RTT timer.

Optionally, in the embodiment of the disclosure, the method is performed in at least one of the following conditions.

The PUCCH has been configured.
The PUCCH is not configured.
The PSFCH has been configured.
The PSFCH has been used.
The PSFCH is not configured.
The PSFCH is not used.

Optionally, in the embodiment of the disclosure, the first event has an association relationship with the conditions for performing the method.

In the embodiment of the disclosure, different events may correspond to different conditions for performing the method.

For example, the event is: after the terminal receives the PDCCH, and the conditions may include at least one of the PUCCH not being configured, the PSFCH not being configured or the PSFCH not being used.

For another example, the event is: after the terminal transmits at least one of the PSCCH or the PSSCH, and the conditions may include at least one of the PUCCH not being configured, the PSFCH not being configured or the PSFCH not being used.

For another example, the event is: after the terminal receives the PSFCH, and the condition may include at least one of the PUCCH not being configured, the PSFCH having been configured or the PSFCH having been used.

For another example, the event is: after the terminal transmits the PUCCH, and the conditions may include at least one of the PUCCH having been configured, the PSFCH having been configured, the PSFCH having been used, the PSFCH not being configured or the PSFCH not being used.

In the embodiment of the disclosure, various correspondences between the events and the conditions may also be set separately, and an event for triggering the timer may be selected based on different execution conditions.

For example, the event is: after the terminal receives the PDCCH, and a corresponding condition is that the PUCCH is not configured and the PSFCH is not configured. The event is: after the terminal transmits at least one of the PSCCH or the PSSCH, and a corresponding condition is that the PUCCH has been configured and the PSFCH is not configured. The event is: after the terminal receives the PSFCH, and a corresponding condition is that the PUCCH is not configured and PSFCH has been configured. The event is: after the terminal transmits the PUCCH, and a corresponding condition is that PUCCH has been configured and PSFCH has been configured.

For another example, the event is: after the terminal receives the PDCCH, and a corresponding condition is that the PUCCH is not configured, the PSFCH is not configured and the PSFCH is not used. The event is: after the terminal transmits at least one of the PSCCH or the PSSCH, and a corresponding condition is that the PUCCH has been configured, the PSFCH is not configured and the PSFCH is not used. The event is: after the terminal receives the PSFCH, and a corresponding condition is that the PUCCH is not configured, the PSFCH has been configured and the PSFCH has been used. The event is: after the terminal transmits the PUCCH, and a corresponding condition is that the PUCCH has been configured, the PSFCH has been configured and the PSFCH is not used.

According to the embodiments of the disclosure, the state of the timer related to the DRX for the sidelink may be controlled based on the events, so that the DRX may be optimized to reduce energy consumption of the terminal for sidelink transmission. For example, in a scenario where the terminal is configured as the mode-A and uses the DRX mechanism, the terminal may control the state of the timer related to the DRX for the sidelink based on some events after receiving the downlink information from the network, thereby reducing the energy consumption of the terminal for the sidelink transmission.

In an application example, a time point of starting the timer in the embodiments of the disclosure may be a first time unit (symbol, slot, or the like) after the event occurs. The event may be a transmitting/receiving behavior of a specific channel such as the PDCCH, the PSCCH, the PSSCH, the PSFCH, the PUCCH, or the like. When the channel includes one or more time units, the timer may be started at the first or the last time unit of the channel.

The timer in the embodiments of the disclosure is introduced as follows.

The RTT timer: during operation of the timer, the UE does not need to perform downlink PDCCH reception, or does not need to perform the downlink PDCCH reception for a specific HARQ process of the sidelink.

The retransmission timer: during operation of the timer, the UE needs to perform the downlink PDCCH reception, or needs to perform the downlink PDCCH reception for a specific HARQ process of the sidelink.

Figure 5:
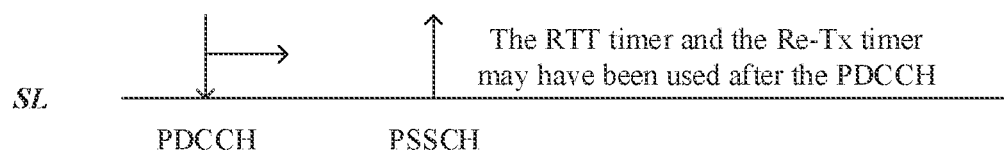
FIG. 5 is a diagram of a first example.

First example: the timer is started according to the PDCCH. Referring to FIG. 5, the example may include the following operations.

1. UE receives the PDCCH.
2. In a case that the PDCCH indicates resource grant of the sidelink, the timer related to the DRX is started, for example:
   a) The RTT timer for the sidelink is started; and/or
   b) The retransmission timer (Re-Tx timer) for the sidelink is started.

Specifically, manners of starting the timer may include at least one of the followings.

a) In a case that the RTT timer and the retransmission timer are included, the retransmission timer for the sidelink is stopped, and the retransmission timer for the sidelink is started in response to the expiration of the RTT timer.

b) In case that only the retransmission timer is included, the running retransmission timer for the sidelink is stopped, and the retransmission timer for the sidelink is restarted.

Optionally, whether to start the retransmission timer may be determined based on feedback information. One manner may include that whether to start the retransmission timer for the sidelink is determined according to whether a UE at a reception side feeds back the ACK. If the ACK is fed back, the retransmission timer for the sidelink is not started. Otherwise, the retransmission timer for the sidelink is started. Another manner may include that whether to start the retransmission timer for the sidelink is determined according to whether the UE at the reception side feeds back information. If the information is fed back, the retransmission timer for the sidelink is started. Otherwise, the retransmission timer for the sidelink is not started.

Optionally, solution of the example may be used in at least one of the following cases.
  a) The PUCCH is not configured.
  b) The PSFCH is not configured.
  c) The PSFCH is not used.

Figure 6:
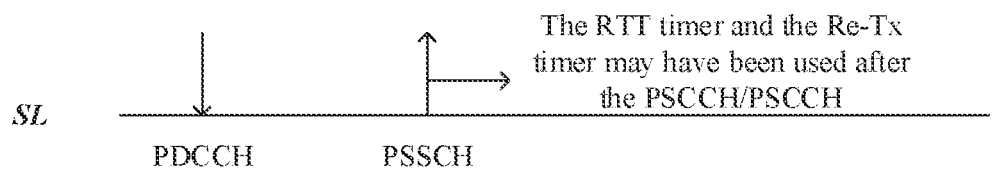
FIG. 6 is a diagram of a second example.

Second example: the timer is started according to the PSCCH/PSSCH. Referring to FIG. 6, the example may include the following operations.
  1. The UE receives the PDCCH.
  2. In a case that the PDCCH indicates the resource grant of the sidelink, the UE performs transmission of the PSCCH/PSSCH according to the resource grant.
  3. After the transmission of the PSCCH/PSSCH is performed, the timer related to the DRX is started, for example:
    a) The RTT timer for the sidelink is started; and/or
    b) The retransmission timer for the sidelink is started.
  Specifically, descriptions of manners of starting the timer may refer to the first example.
  Optionally, descriptions of determining whether to start the retransmission timer based on the feedback information may refer to the first example.

Optionally, solution of the example may be used in at least one of the following cases.
  a) The PUCCH is not configured.
  b) The PSFCH is not configured.
  c) The PSFCH is not used.

Figure 7:
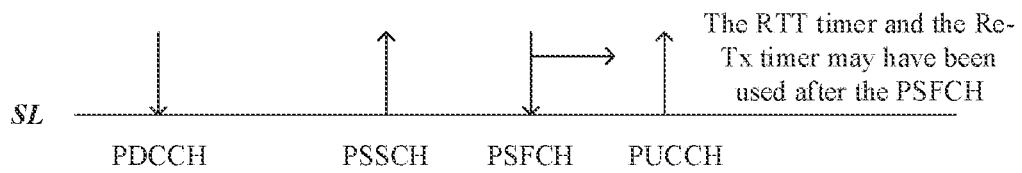
FIG. 7 is a diagram of a third example.

Third example: the timer is started according to the PSFCH. Referring to FIG. 7, the example may include the following operations.
  1. The UE receives the PDCCH.
  2. If the PDCCH indicates the resource grant of the sidelink, the UE performs the transmission of the PSCCH/PSSCH according to the resource grant.
  3. The UE receives the PSFCH corresponding to the transmission of the PSCCH/PSSCH.
  4. After the PSFCH is received, the timer related to the DRX is started, for example:
    a) The RTT timer for the sidelink is started; and/or
    b) The retransmission timer for the sidelink is started.
  Specifically, descriptions of manners of starting the timer may refer to the first example.
  Optionally, descriptions of determining whether to start the retransmission timer based on the feedback information may refer to the first example.

Optionally, solution of the example may be used in at least one of the following cases:
  a) The PUCCH is not configured.
  b) The PSFCH has been configured.
  c) The PSFCH has been used.

Figure 8:
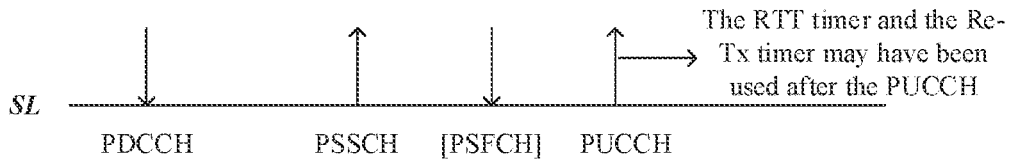
FIG. 8 is a diagram of a fourth example.

Fourth example: the timer is started according to the PUCCH. Referring to FIG. 8, the example may include the following operations.
  1. The UE receives the PDCCH.
  2. If the PDCCH indicates the resource grant of the sidelink, the UE performs the transmission of the PSCCH/PSSCH according to the resource grant.
  3. The UE receives the PSFCH corresponding to the transmission of PSCCH/PSSCH.
  4. The UE reports the PUCCH.
  5. After the PUCCH is reported, the timer related to the DRX is started, for example:
    a) The RTT timer for the sidelink is started; and/or
    b) The retransmission timer for the sidelink is started.
  Specifically, descriptions of manners of starting the timer may refer to the first example.
  Optionally, descriptions of determining whether to start the retransmission timer based on the feedback information may refer to the first example.

Optionally, solution of the example may be used in at least one of the following cases:
  a) The PUCCH has been configured.
  b) The PSFCH has been configured.
  c) The PSFCH has been used.
  d) The PSFCH is not configured.
  e) The PSFCH is not used.

Furthermore, solutions of the first to fourth examples may be combined.

For example, the UE starts at least one of the RTT timer or the retransmission timer based on the event of the first example. Then, the UE starts at least one of the RTT timer or the retransmission timer based on at least one event of the second example, the third example or the fourth example. Manners of restarting at least one of the RTT timer or the retransmission timer may include: (1) when a RTT timer is running at this time: if the RTT timer needs to be started, the running RTT timer is restarted, and if the retransmission timer needs to be started, the retransmission timer is started after the expiration of the current RTT timer. (2) when the retransmission timer is running at this time: if the retransmission timer needs to be started, the retransmission timer is restarted.

For another example, the UE starts at least one of the RTT timer or the retransmission timer based on the event of the second example. Then, the UE starts at least one of the RTT timer or the retransmission timer based on at least one event of the first example, the third example or the fourth example. Manners of restarting at least one of the RTT timer or the retransmission timer may refer to related descriptions of the above examples.

For another example, the UE starts at least one of the RTT timer or the retransmission timer based on the event of the third example. Then, the UE starts at least one of the RTT timer or the retransmission timer based on at least one event of the first example, the second example or the fourth example. Manners of restarting at least one of the RTT timer or the retransmission timer may refer to related descriptions of the above examples.

For another example, the UE starts at least one of the RTT timer or the retransmission timer based on the event of the fourth example. Then, the UE starts at least the RTT timer or the retransmission timer based on at least one event of the first example, the second example or the third example. Manners of restarting at least one of the RTT timer or the retransmission timer may refer to related descriptions of the above examples.

According to the embodiments of the disclosure, a power saving mechanism of the sidelink is optimized, so that a power saving effect may still be achieved on downlink reception in case that the network schedules the resources of the sidelink.

Figure 9:
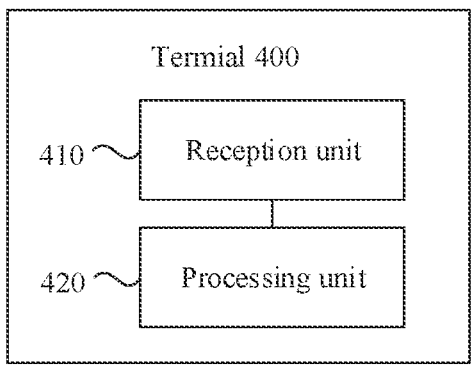
FIG. 9 is a block diagram of a terminal according to an embodiment of the disclosure.

FIG. 9 is a block diagram of a terminal 400 according to an embodiment of the disclosure. The terminal 400 may include a reception unit 410 and a processing unit 420.

The reception unit 410 is configured to receive downlink information. The downlink information is configured to indicate resource grant of a sidelink.

The processing unit 420 is configured to control a state of a timer related to DRX for the sidelink based on a first event.

Optionally, in the embodiment of the disclosure, the downlink information is carried by a PDCCH.

Optionally, in the embodiment of the disclosure, the timer related to the DRX includes at least one of a RTT timer or a retransmission timer.

Optionally, in the embodiment of the disclosure, the processing unit is further configured to perform at least one of the following operations.

A RTT timer for the sidelink is started.

A retransmission timer for the sidelink is started in response to expiration of the RTT timer.

Optionally, in the embodiment of the disclosure, the processing unit is further configured to start the retransmission timer for the sidelink.

Optionally, in the embodiment of the disclosure, the processing unit is further configured to determine whether to start the retransmission timer for the sidelink based on feedback information.

Optionally, in the embodiment of the disclosure, the processing unit is further configured to perform at least one of the following operations.

The retransmission timer for the sidelink is not started, in response to the feedback information being ACK information.

The retransmission timer for the sidelink is started, in response to the feedback information being NACK information.

The retransmission timer for the sidelink is started, in response to reception of the feedback information.

The retransmission timer for the sidelink is not started, in response to no reception of the feedback information.

Optionally, in the embodiment of the disclosure, the processing unit is further configured to stop a running retransmission timer for the sidelink.

Optionally, in the embodiment of the disclosure, the first event may include the following.

After the terminal receives a PDCCH including the downlink information.

Optionally, in the embodiment of the disclosure, the first event may include the following.

After the terminal transmits at least one of a PSCCH or a PSSCH.

Optionally, in the embodiment of the disclosure, the first event may include the following.

After the terminal receives a PSFCH.

Optionally, in the embodiment of the disclosure, the first event may include the following.

After the terminal transmits a PUCCH.

Optionally, in the embodiment of the disclosure, the processing unit of the terminal is run in at least one of the following conditions.

The PUCCH has been configured.
The PUCCH is not configured.
The PSFCH has been configured.
The PSFCH has been used.
The PSFCH is not configured.
The PSFCH is not used.

Optionally, in the embodiment of the disclosure, the first event has an association relationship with the condition of the processing unit of the terminal.

The terminal 400 of the embodiments of the disclosure may implement corresponding functions of the terminal in the foregoing method embodiment. Processes, functions, implementations and beneficial effects corresponding to modules (sub-modules, units, or components, or the like) of the terminal 400 may refer to corresponding descriptions in the foregoing embodiments of the method 200, and would not be elaborated here. It should be noted that the functions described with respect to the modules (sub-modules, units, or components, or the like) of the terminal 400 of the embodiments of the disclosure may be implemented by different modules (sub-modules, units, or components, or the like), or may be implemented by the same module (sub-module, unit, or component, or the like).

Figure 10:
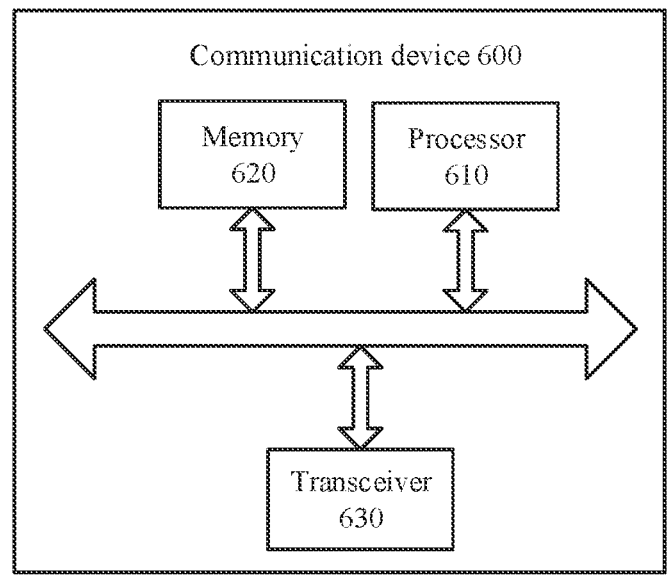
FIG. 10 is a block diagram of a communication device according to an embodiment of the disclosure.

FIG. 10 is a structural diagram of a communication device 600 according to an embodiment of the disclosure. The communication device 600 includes a processor 610 which may call and run a computer program from a memory to enable the communication device 600 to implement the methods of the embodiments of the disclosure.

Optionally, the communication device 600 may further include a memory 620. The processor 610 may call and run a computer program from the memory 620 to enable the communication device 600 to implement the methods of the embodiments of the disclosure.

The memory 620 may be a separate device independent of the processor 610, or may be integrated into the processor 610.

Optionally, the communication device 600 may further include a transceiver 630. The processor 610 may control the transceiver 630 to communicate with other devices, specifically, to transmit information or data to other devices, or to receive information or data from other devices.

The transceiver 630 may include a transmitter and a receiver. The transceiver 630 may further include antennas, and a number of antennas may be one or more.

Optionally, the communication device 600 may be the terminal of the embodiments of the disclosure, and the communication device 600 may implement corresponding processes implemented by the terminal in various methods of the embodiments of the disclosure, which would not be elaborated here for brevity.

Figure 11:
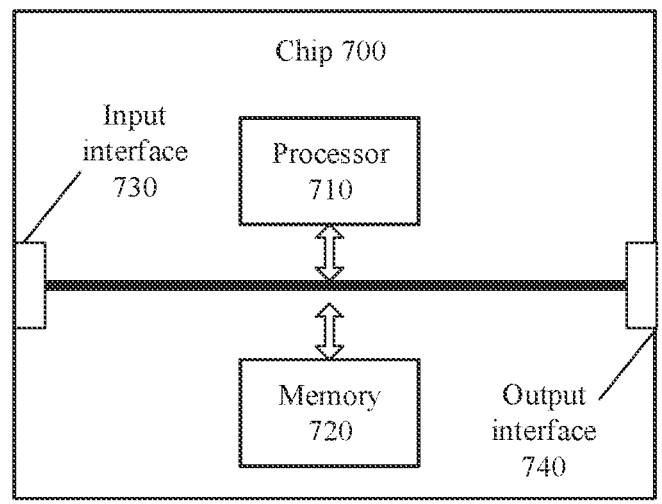
FIG. 11 is a block diagram of a chip according to an embodiment of the disclosure.

FIG. 11 is a structural diagram of a chip 700 according to an embodiment of the disclosure. The chip 700 includes a processor 710 which may call and run a computer program from a memory to implement the methods of the embodiments of the disclosure.

Optionally, the chip 700 may further include a memory 720. The processor 710 may call and run a computer program from the memory 720 to implement the methods performed by the terminal of the embodiments of the disclosure.

The memory 720 may be a separate device independent of the processor 710, or may be integrated into the processor 710.

Optionally, the chip 700 may further include an input interface 730. The processor 710 may control the input interface 730 to communicate with other devices or chips, specifically, to obtain information or data from other devices or chips.

Optionally, the chip 700 may further include an output interface 740. The processor 710 may control the output interface 740 to communicate with other devices or chips, specifically, to output information or data to other devices or chips.

Optionally, the chip may be applied to the terminal in the embodiments of the disclosure, and the chip may implement corresponding processes implemented by the terminal in various methods of the embodiments of the disclosure, which would not be elaborated here for brevity.

It should be understood that the chip mentioned in the embodiment of the disclosure may also be referred to as a system-level chip, a system chip, a chip system, an on-chip system chip, or the like.

The processor as mentioned above may be a general-purpose processor, a Digital Signal Processor (DSP), a Field Programmable Gate Array (FPGA), an Application Specific Integrated Circuit (ASIC), or other programmable logical devices, a transistor logical device, a discrete hardware component, or the like. The general-purpose processor as mentioned above may be a microprocessor, or may be any conventional processor, or the like.

The memory as mentioned above may be a volatile memory or a non-volatile memory, or may include both the volatile and non-volatile memories. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It should be understood that the memory as mentioned above is illustrative rather than restrictive. For example, the memory in the embodiments of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), or the like. That is, the memory in the embodiments of the disclosure is intended to include, but is not limited to, memories of these and any other proper types.

Figure 12:
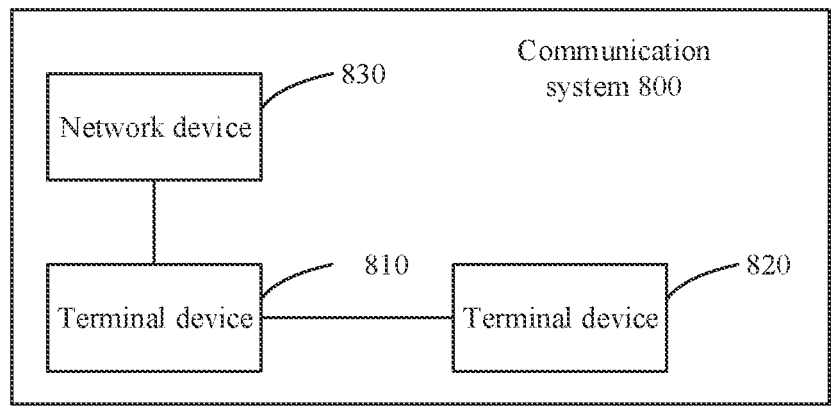
FIG. 12 is a block diagram of a communication system according to an embodiment of the disclosure.

FIG. 12 is a block diagram of a communication system 800 according to an embodiment of the disclosure. The communication system 800 includes a terminal device 810, a terminal device 820 and a network device 830.

The terminal device 810 is configured to receive downlink information which is configured to indicate resource grant of a sidelink, and control a state of a timer related to DRX for the sidelink based on a first event.

The terminal device 820 is configured to perform sidelink communication with the terminal device 810.

The network device 830 is configured to transmit the downlink information.

The terminal device 810 is configured to implement corresponding functions implemented by the terminal at the transmission side in the foregoing methods. The terminal device 820 is configured to implement corresponding functions implemented by the terminal at the reception side in the foregoing methods. The network device 830 is configured to implement corresponding functions implemented by the network device in the foregoing methods. Details are not elaborated here for brevity.

All or part of the foregoing embodiments may be implemented by software, hardware, firmware, or any combination thereof. When implemented by using software, all or part of the foregoing embodiments may be implemented in a form of a computer program product. The computer program product includes one or more computer instructions. When the computer program instructions are loaded and executed on a computer, all or part of the processes or functions according to the embodiments of the disclosure are generated. The computer may be a general-purpose computer, a special purpose computer, a computer network, or another programmable device. The computer instructions may be stored in a computer-readable storage medium or transmitted from one computer-readable storage medium to another computer-readable storage medium. For example, the computer instructions may be transmitted from one website site, computer, server or data center to another website site, computer, server or data center in a wired (e.g., coaxial cable, optical fiber, Digital Subscriber Line (DSL)) or wireless (e.g., infrared, wireless, microwave, or the like) manner. The computer-readable storage medium may be any available medium accessible by a computer, or a data storage device integrated with one or more available media, such as a server or a data center. The available medium may be a magnetic medium (such as a floppy disk, a hard disk, or a magnetic tape), an optical medium (such as a Digital Versatile Disk (DVD)), or a semiconductor medium (such as a Solid State Disk (SSD)), or the like.

It should be understood that in various embodiments of the disclosure, size of a serial number of each process does not indicate an execution sequence of each process, and the execution sequence of each process should be determined by its function and internal logic, and should not form any limitation on implementation processes of the embodiments of the disclosure.

It should be clearly understood by those skilled in the art that for convenience and brevity of descriptions, specific working processes of the system, device and unit as mentioned above may refer to corresponding processes in the foregoing method embodiments, which are not elaborated here.

The foregoing are only specific embodiments of the disclosure, however, the scope of protection of the disclosure is not limited thereto. Variation and substitution which may be readily conceived by those skilled in the art within the technical scope disclosed in the disclosure should fall within the scope of protection of the disclosure. Therefore, the scope of protection of the disclosure should conform to the scope of protection of the claims.

What is claimed is:

1. A sidelink transmission method, comprising:
   receiving, by a terminal, downlink information, wherein the downlink information is configured to indicate resource grant of a sidelink; and
   controlling, by the terminal, a state of a timer related to discontinuous reception (DRX) for the sidelink based on a first event,
   wherein the first event comprises:
   receiving, by the terminal, a Physical Downlink Control Channel (PDCCH) comprising the downlink information,
   wherein controlling, by the terminal, the state of the timer related to the DRX for the sidelink based on the first event comprises:
   starting a round-trip time (RTT) timer for the sidelink at a next symbol in time sequence after receiving the PDCCH.

2. The method of claim 1, wherein the timer related to the DRX comprises at least one of the RTT timer or a retransmission timer.

3. The method of claim 2, wherein controlling the state of the timer related to the DRX for the sidelink further comprises at least one of following operations:
   starting the RTT timer for the sidelink; or
   in response to expiration of the RTT timer, starting the retransmission timer for the sidelink.

4. The method of claim 2, wherein controlling the state of the timer related to the DRX for the sidelink further comprises:
   starting the retransmission timer for the sidelink.

5. The method of claim 1, wherein the first event further comprises:
   transmitting, by the terminal, a Physical Sidelink Shared Channel (PSSCH).

6. The method of claim 1, wherein the first event further comprises:
   transmitting, by the terminal, a Physical Uplink Control Channel (PUCCH).

7. The method of claim 6, wherein the method is performed in at least one of following conditions:
   the PUCCH having been configured; or
   the PUCCH not being configured.

8. The method of claim 7, wherein the first event has an association relationship with the conditions for performing the method.

9. A terminal, comprising:
   transceiver, configured to receive downlink information, wherein the downlink information is configured to indicate resource grant of a sidelink; and
   processor, configured to control a state of a timer related to discontinuous reception (DRX) for the sidelink based on a first event,
   wherein the first event comprises:
   receiving, by the terminal, a Physical Downlink Control Channel (PDCCH) comprising the downlink information,
   wherein the processor is further configured to:
   start a round-trip time (RTT) timer for the sidelink at a next symbol in time sequence after receiving the PDCCH.

10. The terminal of claim 9, wherein the timer related to the DRX comprises at least one of the RTT timer or a retransmission timer.

11. The terminal of claim 10, wherein the processor is further configured to perform at least one of following operations:
    starting the RTT timer for the sidelink; or
    in response to expiration of the RTT timer, starting the retransmission timer for the sidelink.

12. The terminal of claim 9, wherein the first event further comprises:
    transmitting, by the terminal, a Physical Sidelink Shared Channel (PSSCH).

13. The terminal of claim 9, wherein the first event further comprises:
    transmitting, by the terminal, a Physical Uplink Control Channel (PUCCH).

14. The terminal of claim 13, wherein the processor of the terminal is activated in at least one of following conditions:
    the PUCCH having been configured; or
    the PUCCH not being configured.

15. The terminal of claim 14, wherein the first event has an association relationship with the conditions for activating the processor of the terminal.

16. A non-transitory computer-readable storage medium, having stored thereon a computer program which enables a computer to:
    receive downlink information, wherein the downlink information is configured to indicate resource grant of a sidelink; and
    control a state of a timer related to discontinuous reception (DRX) for the sidelink based on a first event,
    wherein the first event comprises:
    receiving, by the computer, a Physical Downlink Control Channel (PDCCH) comprising the downlink information,
    wherein the computer program further enables the computer to:
    start a round-trip time (RTT) timer for the sidelink at a next symbol in time sequence after receiving the PDCCH.

17. The non-transitory computer-readable storage medium of claim 16, wherein the timer related to the DRX comprises at least one of the RTT timer or a retransmission timer.

18. The non-transitory computer-readable storage medium of claim 17, wherein the computer program further enables the computer to:
    start the RTT timer for the sidelink; or
    in response to expiration of the RTT timer, start the retransmission timer for the sidelink.

19. The non-transitory computer-readable storage medium of claim 16, wherein the first event further comprises:
    transmitting, by the terminal, a Physical Sidelink Shared Channel (PSSCH).

20. The non-transitory computer-readable storage medium of claim 16, wherein the first event further comprises:
    transmitting, by the terminal, a Physical Uplink Control Channel (PUCCH).

* * * * *